United States Patent [19]

Raman et al.

[11] Patent Number: 4,983,404

[45] Date of Patent: Jan. 8, 1991

[54] CONTROLLED RELEASE FLAVOR SYSTEM AND METHOD OF PREPARATION

[75] Inventors: Krishna Raman, Randolph; Subraman R. Cherukuri, Towaco, both of N.J.; Gul Mansukhani, Staten Island, N.Y.; Steven M. Faust, Stanhope, N.J.

[73] Assignee: Warner-Lambert Company, Morris Plains, N.J.

[21] Appl. No.: 361,529

[22] Filed: Jun. 5, 1989

[51] Int. Cl.$^5$ .......................... A23G 3/30; A23L 1/22
[52] U.S. Cl. ...................................... 426/3; 426/650; 426/651; 426/6
[58] Field of Search ........................ 426/3-6, 426/650, 651, 99

[56] References Cited

U.S. PATENT DOCUMENTS

| | | | |
|---|---|---|---|
| 17,264 | 5/1857 | Corbin | 426/658 |
| 3,959,510 | 5/1976 | Felton et al. | 426/651 |
| 4,087,557 | 5/1978 | Bakal | 426/804 |
| 4,206,301 | 6/1980 | Yolles | 426/651 |
| 4,448,789 | 5/1984 | Yang | 426/651 |
| 4,528,125 | 7/1985 | Alderman | 426/651 |
| 4,587,129 | 5/1986 | Kliment | 426/651 |
| 4,752,481 | 6/1988 | Dokuzovic | 426/651 |

*Primary Examiner*—Jeanette Hunter
*Attorney, Agent, or Firm*—Daniel A. Scola, Jr.

[57] ABSTRACT

A flavor delivery system is disclosed which offers the combination of improved flavor intensity and extension and, when incorporated into chewing gums, provides desired softness to the gum to facilitate the reduction in softening additives that conventionally add moisture thereto. The present delivery system comprises a composite of a flavor and a resin preferably in a solution mixture with each other, the flavor being present in an amount of from about 20% to about 80% of the final delivery system, with the resin comprising the remainder. Optionally, an emulsifier may be added in an amount of up to 25% by weight. In a further embodiment, the delivery system of the present invention may include up to 25% by weight of a sweetener such as acesulfame-K. The present delivery system finds use in comestibles such as chewing gum compositions and other food products, pharmaceuticals, and scratch-and-sniff and aroma packaging products. The delivery system may be incorporated as a liquid or may be prepared in particulate form.

27 Claims, 5 Drawing Sheets

CONTROLLED RELEASE FLAVOR SYSTEM AND METHOD OF PREPARATION

This invention relates to a new flavor release system and to the process for its preparation, which has use in a variety of products including comestibles such as chewing gum compositions, confectioneries, pharmaceuticals, food products such as beverages and some baked goods, dentifrice compositions and denture adhesives and in packaging applications. More particularly, this invention relates to a process for preparing a flavor release system which provides enhancement of flavor and sweeteners with a controlled sustained release and intensity.

Flavor delivery systems are well known in the art which may be divided into various classes based upon their physical states, namely, liquids, emulsions, pastes or solids. Not only are these states different but the potential uses for each state also differ as do their method of manufacture.

Over the years considerable effort has been directed toward the preparation of flavoring materials Specifically, flavor materials have been sought that provide greater flavor intensity coupled with sustained flavor release for long periods of time.

An outgrowth of this activity has been the observation that when free flavor oil is added to gum base, only about 5% to 40% of the initial flavor oil is released from the gum upon chewing It appears that as much as 80% of the remaining flavor oil becomes irreversibly bound to the gum base and cannot be chewed out.

To overcome this difficulty with flavor oils in particular, various attempts have been made to encapsulate the flavor oils or use dried ingredients to inhibit the gum base binding action. In addition, considerable effort has been directed to the development of delayed release flavoring agents that will delay release of the flavoring agent while permitting uniform release of the flavor over an extended period of time. The obvious benefit of immediate/delayed release is the ability to provide uniform flavor sensation during the entire consumption period which has not been previously attainable by the direct incorporation of conventional seasonings and flavor oils into chewing gum formulations.

Spray drying is one of the most widely used techniques to encapsulating or fixing a flavor. In this procedure a flavor oil is usually blended with a film forming agent dispersed in water and then emulsified to form a stable emulsion. Emulsification is necessary because flavor oils are insoluble in the water needed to dissolve the film forming agent. Obtaining an emulsion of low viscosity, at high solids content, is critical to producing an acceptable product. Stability at higher temperatures is also critical to avoid volatilization of the flavor oil. Maintaining low inlet temperatures (i.e. around 155° C.) as well as minimizing the residence time in the dryer are beneficial if the flavor is chemically unstable. The air drying conditions depend on the emulsion and product characteristics such as particle size of the product required. Modifications to the use of heat to remove the water from the emulsion have also been attempted. Some of these include the use of a dehydrating solvent as the drying medium rather than hot air. Freeze drying has also been contemplated.

Flavor fixation has also been obtained by the extrusion method wherein the flavor oil is coextruded with a water soluble sugar or sugar mixture, dried and ground for use. These products find application in dry mixes for instant release of the flavor on contact with water. Such products generally contain 10 to 15% by weight of flavor oil.

An extensive discussion of the prior art with respect to the extension of flavor is found in U.S. Pat. No. 4,590,075 to Wei et al. The patentees discuss the preparation of encapsulated flavors which are added together with a quantity of a nonconfined hydrophobic flavor oil to a suspension agent before formulation in a chewing gum (U.S. Pat. No. 3,920,849 to Marmo et al.); the encapsulation of flavor in high molecular weight material such as polyvinyl acetate (U.S. Pat. No. 3,826,847 to Ogawa et al.); the preparation of a flavor composite by crosslinking the flavor with a water-insoluble hydrophilic polymer such as hydroxyethyl acrylate (U.S. Pat. No. 3,761,286); the preparation of microencapsulated flavor particles and their dispersion in a slurry on the surface of a chewing gum (U.S. Pat. No. 3,962,463). Further, U.S. Pat. No. 4,695,463 to Yang et al. is noted and discloses a flavor delivery system that relies on the immobilization of the flavor within a crosslinked hydrocolloid multivalent alginate or carageenenate matrix.

Further, U.S. Pat. No. 4,597,970 to Sharma et al. prepares a delivery system for actives such as sweeteners and including flavors which utilizes a hdrophobic matrix comprising edible fatty acids or waxes, lecithin and a glyceride component. This system is urged to provide a protective barrier and controlled release characteristics to the active so contained. The combination of materials in the encapsulating matrix provides wetting capabilities with respect to non-uniform core materials such as aspartame, while providing improved heat stability and thereby, extended high temperature processing capability. These attributes were frequently achieved at a cost of delay in release of the active.

U.S. Pat. No. 3,867,556 to Darragh et al. also encapsulated volatile flavors in a fat or wax material. The patentees had found that the initial or base encapsulation displayed excessive instability to heat, and as their product was intended primarily for incorporation into baked goods, they applied a second coating of a water-soluble material such as gum arabic, which would provide high temperature stability while conferring rapid disintegration on contact with moisture. The Darragh et al. product likewise exhibited delayed flavor release.

Further, U.S. Pat. No. 4,515,769 to Merritt et al. disclosed the encapsulation of flavor material in a partially hydrophilic matrix comprising gelatin, a natural gum or albumin or a plasticizer. This combined encapsulant was placed in an emulsion with the flavoring agent and thereafter dried to a solid matrix which was then ground to a base powder. The base powder was then coated with a water-insoluble material which purported to prevent flavor loss and delay flavor release in contact with moisture. Merritt et al. sought only to achieve a burst of flavor when the physical mastication of their flavor composite ruptured the outer encapsulating material.

U.S. Pat. No. 4,087,557 to Bakal et al. relates to the incorporation of an artificial sweetener directly into the ester gum component of a chewing gum base, to achieve a delay and corresponding extension in sweetener release (column 2, lines 31–42). The patent contemplates the incorporation of certain flavors, specifically, food acids such as tartaric acid, succinic acid, etc. directly into the ester gum component, however, indicates that conventional flavors such as flavor oils are added separately after the gum base constituents including the artificial sweetener containing-ester gum have been mixed with each other and cooled. The flavor component is incorporated into chewing gums prepared in accordance with the patent in the conventional fashion, i.e., by direct incorporation of artificial flavor and/or by the incorporation of flavor coated with a hydrophilic material such as gum arabic (see Example 6). Bakal et al. accordingly offers no solutions to the problems of flavor delivery and extension of concern to the art.

Other approaches to the preparation of flavor composites, particularly with flavor oils, are noted. Thus, U.S. Pat. No. 3,041,180 to Swisher discloses a process for extruding a flavor oil with glycerine and corn syrup solids to form an encapsulated extruded flavor oil. The solid was dried and yielded a particulate solid. U.S Pat. No. 4,610,890 to Miller et al. discloses another process for preparing an extruded flavor oil with sugar, a starch hydrolysate and an emulsifier.

U.S. Pat. Nos. 4,448,789 and 4,569,852 to Yang discloses a novel flavoring agent—hydrophilic polymer—by blending the flavor with the polymer and blending while heating to prepare a homogenous product. Once coupled and ground, the product can be used as a flavoring for chewing gum and confectionery products.

U.S. Pat. No. 4,271,202 to Giel relates to a spray-drying process for forming solid flavoring material capable of including high percentages of flavoring oil per total particulate unit of weight. Because of the high oil content possible, such spray-dried products found wide use in a number of beverages and other foods. However, it was also found that spray-dried flavors prepared by this and similar known methods typically exhibit a relatively limited shelf life. In addition, the high temperatures necessarily involved during spray-drying processes have been found to impair the flavor and aroma of various heat-sensitive oil flavors, such as those in citrus fruit. Furthermore, solids formed by spray-drying commonly exhibit hygroscopic characteristics making them difficult to handle and store.

In addition to these techniques, U.S. Pat. No. 4,452,821 to Gergely is directed to a confectionery product, especially a chewing gum, that purports to offer prolonged, extended delivery of flavoring aroma and/or active pharmaceutical ingredient. This is accomplished by providing the flavoring, aroma or active pharmaceutical ingredient in a solid solution or mixture within a wax containing functional groups, said wax forming a homogeneous mixture of solid solution. The wax does not contain any functional groups and is substantially immiscible with the flavoring, aroma or active pharmaceutical ingredient.

The approaches to flavor modification discussed above all fall short of providing a flavor delivery system which achieves the advantages of flavor intensity and fullness inherent in flavor oils in combination with improved release and extension characteristics. In most instances, the gum base and, in particular, the elastomer component sequesters the flavor and thereby prevents its release during the chew. Moreover, the plasticizers and softeners conventionally employed in gum formulations tend to increase moisture pickup and corresponding flavor migration and loss, so that the flavor that might be available for release on chewing is further diminished in content and resulting extent of release and sensation. A need, therefore, exists for the development of a flavor delivery system which remedies the aforenoted problems by preventing or at least minimizing the sequestration of the flavor component within the gum base while at the same time promoting improved flavor intensity and longevity, and increased amount of flavor release from chewing gum base in combination with desirable organoleptic properties and reduced moisture pickup.

SUMMARY OF THE INVENTION

A flavor release system comprising a composite flavor having improved flavor retention, softening and flavor release characteristics when incorporated into chewing gums and other products, is prepared with a liquid flavor, preferably a flavor oil, and a resin component selected from wood rosins and ester gums and mixtures. The flavor component is preferably a flavor oil and is present in an amount by weight of the total composite of from about 20% to about 80%, with the resin component comprising the remainder. More particularly, the flavor component is present in an amount from about 35% to about 65% by weight, remainder comprising the resin component, with a most preferred formulation comprising equal quantities by weight of both components.

The present composite may be prepared by heating the resin component to its melting point followed by adding the flavor component under agitation until a homogeneous mixture and solution results. Optionally, an emulsifier may be initially added to the resin melt, and the resulting composite will comprise a composite emulsion The present composite flavor is generally liquid or semi-liquid in state, depending upon the amount of resin present, and the melting points of the resin and flavor components.

The primary advantage of the flavor delivery system of the present invention flows from the protective effect that the resin component exerts on the flavor component. As a result of this protective effect the flavor is held by the resin, and chewing gums formulated with the present flavor composite exhibit delayed-sustained flavor release.

A further advantage of the present flavor delivery system resides in its generally liquid state. Specifically, the final flavor-resin composite is a liquid and may be directly incorporated into chewing gum formulations in the liquid state, thereby reducing the amount cf moisture added during gum formulation and consequently, reducing the moisture content of the final gum product. The present flavor composite acts as a softener to the elastomer component of the gum base and thereby reduces the amount of conventional softeners such as glycerin, corn syrup, sorbo liquid and gum arabic solution that must be added, so that the resulting gum formulation is less likely to exhibit undesirable moisture pickup. The foregoing combination permits the formulation of low moisture gum formulations.

Moreover, the resin component acts as both a carrier and binder in that it ties up the flavor and masks its aroma even at the higher temperatures at which the present composite is prepared, and at which chewing gum compositions receiving the flavor composite are processed. An advantage, therefore, of this temperature stability is that flavor loss during product formulation employing the present flavor composite is substantially reduced.

The present composite finds utility in a variety of food and confectionery products as an additive thereto, and in a further embodiment, may be formulated with a sweetener in an amount that may range up to about 25% by weight thereof to offer a combined sensation of flavor and sweetness. For example and as illustrated herein, the present composite was formulated with 10% by weight of acesulfame-K and was found to provide an excellent presentation vehicle for the sweetener. The present delivery system provides the same protection to both actives and thereby enhances the longevity and intensity of both flavor and sweetness release that are experienced.

The composite may, accordingly, be incorporated into chewing gums and particularly into low calorie, low moisture formulations, as well as a flavorant in pharmaceutical preparations and as a part of tablet coating, and in such novel products as "scratch-and-sniff" and aroma packaging.

The flavor delivery system of the present invention may be used alone or in combination with conventional flavors including spray dried flavors and the like. Also, although the present flavor delivery system is generally prepared and received as a liquid or semi-liquid, it can be prepared in solid form by such techniques as spray drying and the like.

In a further embodiment, the present invention includes a chewing gum comprising a gum base, sweeteners, fillers, and other additives and the present flavor delivery system. Both sugar containing and sugarless gums are contemplated, including gums with high gum base-low carbohydrate content.

The flavor delivery system is prepared by heating the resin component to its melting point which, in most instances, ranges from about 85° C. to about 90° C., after which the resulting melt is cooled to a temperature of less than 85° C. to minimize flashing off of the subsequently added flavor component. Thereafter, the resin is permitted to slowly cool while the flavor component or oil is added with agitation. Upon the completion of the addition of the flavor component, the resulting blend is continually stirred until it cools to approximately room temperature. The resulting blend may then be recovered and will be found to be generally liquid or semi-liquid or clear or amber in color. Any additions of emulsifier take place prior to the addition of the flavor component so that the emulsifier and resin are mixed and melted together. Any additions of artificial sweeteners take place either simultaneously or sequentially after the addition of the flavor to the resin melt, with the remainder of the processing remaining essentially the same.

Accordingly, it is a principal object of the present invention to provide a flavor delivery system that offers delayed flavor release characteristics.

It is a further object of the present invention to provide a flavor delivery system as aforesaid which provides improved flavor intensity and longevity in a component which provides desired plasticity to chewing gums into which it is incorporated.

It is a still further object of the present invention to provide a chewing gum composition or other comestible product having contained therein the flavor delivery system of the present invention.

It is a still further object of the present invention to prepare a flavor delivery system having included therein an artificial sweetener for the improved delivery of both flavor and sweetness.

Other objects and advantages will become apparent to those skilled in the art from a consideration of the ensuing description which proceeds with reference to the following illustrative drawings.

DETAILED DESCRIPTION

In accordance with the present invention, a flavor delivery system is disclosed which offers improved flavor protection and release characteristics in conjunction with unexpected softening properties when incorporated into chewing gum compositions. The flavor delivery system accordingly comprises a non-aqueous solution mixture of:

(a) a flavor component in an amount of from about 20% to about 80% by weight of the final delivery system; and (b) a resin component, said resin component comprising a rosin, in an amount of from about 80% to about 20% by weight of the final delivery system.

More particularly, the flavor delivery system of the present invention comprises the flavor component in an amount of from about 35% to about 65% by weight of the final flavor delivery system, and the resin component present in an amount of from about 65% to about 35% by weight thereof.

Optionally, an emulsifier may be included, and in a preferred embodiment, the emulsifier may be present in an amount ranging up to about 10% by weight. In the instance where emulsifiers are employed, suitable emulsifiers may include mono-, di and triglyceride esters of fatty acids, polyglycerol esters and the like. More particularly, the emulsifier may be selected from the group consisting of lecithin, stearates, ester derivatives of stearates, palmitates, ester derivatives of palmitates, oleates, ester derivatives of oleates, glycerides, sucrose polyesters, polyglycerolesters and mixtures thereof. In a particularly preferred embodiment, the flavor delivery system of the present invention comprises 50% by weight of the flavor component and 50% by weight of the resin component. Optionally, both components may be present in equal amounts of 45% by weight with an added 10% by weight comprising the emulsifier component.

Though not wishing to be bound to a particular theory of operation, it is believed that the present invention is predicated on the discovery that an interaction exists between flavors and particularly flavor oils and resins such as wood rosins and rosin esters, such that the resins protect and mask the flavor component. Accordingly, it is further theorized that an increase in the amount of resin in solution with a flavor such as a characteristically volatile flavor oil, shields the aroma of the flavor oil and decreases its potent odor.

Useful flavoring agents may be chosen from synthetic flavoring liquids and/or liquids derived from plants, leaves, flowers, fruits, etc., and combinations thereof. Preferably, the flavor component is selected from spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired In general, amounts of about 0.5% to about 10.0% by weight of the final chewing gum composition are usable with amounts of about 0.5% to about 2.5% being preferred and about 0.7% to about 2.0% being most preferred The term "resins" as used herein refers to resins such as wood rosins, rosin esters and ester gums. Suitable resins accordingly may be selected from pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood/gum rosin and partially hydrogenated methyl ester of rosin, such as polymers of alpha-pinene or beta-pinene; terpene resins including polyterpene and mixtures thereof.

The above indicated resin components useful in accordance with the present invention are selected because of their compatible temperature characteristics. Thus, the glycerol ester of partially hydrogenated wood or gum rosin, manufactured by Hercules Chemical and identified as Resin Ester #5, has a softening point ranging from about 79°-88° C. Similarly, the glycerol ester of tall oil rosin has a softening point of about 80°-88° C.; the glycerol ester of wood rosin has a softening point of about 88° C.-96° C.; the deodorized glycerol ester of wood rosin has a softening point of about 88°-96° C.; and the methyl ester of partially hydrogenated wood rosin is liquid at room temperature. Certain of the polyterpenes comprising the terpene hydrocarbon resins have softening points that vary with the type of resin and generally, however, range from about 100°-125° C. Similarly, the pentaerythritol ester of partially hydrogenated wood rosin has a softening point of from about 102°-110° C.; the pentaerythritol ester of wood rosin has a softening point ranging from about 109°-116° C.; the glycerol ester of polymerized rosin has a softening point ranging from about 80°-126° C.; and the glycerol ester of partially dimerized rosin has a comparable softening point.

The present invention includes both sugar containing and sugarless chewing gums comprising a gum base, one or more sweeteners and the present flavor delivery system. In the instance where the gum formulations are being prepared, a variety of softening agents may be utilized for their intended purposes Such softening agents suitable for gum formulations include lecithin, glycerin, acetylated monoglyceride, triacetin, hydrogenated vegetable oils, mineral oils, polyglycerol esters of fatty acids, and mixtures thereof. These softening agents are utilized within conventional amounts for such ingredients.

In accordance with a further embodiment, the present invention includes a chewing gum composition offering improved flavor intensity and longevity, comprising a gum base, a sweetener and a flavor delivery system comprising a non-aqueous solution mixture of:

(a) a flavor component in an amount of from about 20% to about 80% by weight of the final delivery system; and (b) a resin component, said resin component comprising a rosin, in an amount of from about 80% to about 20% by weight of the final delivery system.

With regard to chewing gum formulations in which the novel delivery system is employed, the amount of gum base employed will vary greatly depending on various factors such as the type of base used, consistency desired and other components used to make the final product. In general, amounts of about 5% to about 85% by weight of the final chewing gum composition are acceptable for use in chewing gum composition with preferred amounts of about 15% to about 70% by weight. The gum base may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadienestyrene copolymers, isobutylene-isoprene copolymers, polyethylene, polyisobutylene and polyvinylacetate and mixtures thereof are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or betapinene; terpene resins including polyterpene and mixtures thereof. The solvent may be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerin and the like, for example, natural waxes, petroleum waxes, such as polyurethane waxes, paraffin waxes and microcrystalline waxes may also be incorporated into the gum base to obtain a variety of desirable textures and consistency properties. In accordance with the invention, however, these ingredients may be reduced in amount or in some cases, may be eliminated entirely. When present, these individual additional materials are generally employed in amounts of up to about 15% by weight and preferably in amounts of from about 3% to about 10% by weight of the final gum base composition.

The chewing gum composition may additionally include the conventional additives of coloring agents such as titanium dioxide; emulsifiers such as lecithin and glyceryl monostearate; additional fillers such as aluminum hydroxide, alumina, aluminum silicates, calcium carbonate, and talc and combinations thereof; and additional flavoring agents. These fillers may also be used in the gum base in various amounts. Preferably, the amount of fillers when used will vary from about 4% to about 35% by weight of the final chewing gum.

In the instance where sweeteners are utilized in addition to those that may be included in the delivery system, the present invention contemplates the inclusion of those sweeteners well known in the art, including both natural and artificial sweeteners. Thus, additional sweeteners may be chosen from the following non-limiting list sugars such as sucrose, glucose (corn syrup), dextrose, invert sugar, fructose, polydextrose, cellulose, fibers, and mixtures thereof, saccharine and its various salts such as the sodium or calcium salt; cyclamic acid and its various salts such as the sodium salt; the dipeptide sweeteners such as aspartame; dihydrochalcone compounds, glycyrrhizin; Stevia Rebaudiana (Stevioside); chloro derivatives of sucrose; dihydroflavinol; hydroxyguaiacol esters; L-amino dicarboxylic acid gem-diamines; L-aminodicarboxylic acid aminoalkenoic acid ester amides; and sugar alcohols such as sorbitol, sorbitol syrup, mannitol, xylitol, and the like. Also contemplated as an additional sweetener is the nonfermentable sugar substitute (hydrogenated starch hydrolysate) which is described in U.S. Reissue Pat. No. 26,959. Also contemplated is the synthetic sweetener 3,6-dihydro-6-methyl-1-1,2,3-oxathiazin-4-one-2,2-dioxide, particularly the potassium (acesulfame-K), sodium and calcium salts thereof as described in German Patent No. 2,001,017.7.

Suitable auxiliary flavorings including both natural and artificial flavors, and mints such as peppermint, menthol, artificial vanilla, cinnamon, various fruit flavors, both individual and mixed, and the like are contemplated. The flavorings are generally utilized in amounts that will vary depending upon the amount of the flavor delivery system employed and may, for example, range in amounts of up to about 2% by weight of the final chewing gum composition weight. Thus flavorings may be presented in the delivery system, in the chewing gum composition itself, or both.

The colorants useful in the present invention include the pigments such as titanium dioxide, that may be incorporated in amounts of up to about 1% by weight, and preferably up to about 6% by weight. Also, the colorants may include other dyes suitable for food, drug and cosmetic applications, and known as FD&C dyes and the like. The materials acceptable for the foregoing spectrum of use are preferably water-soluble. Illustrative examples include indigoid dye, known as FD&C Blue No. 2, which is the disodium salt of 5,5'-indigotindisulfonic acid. Similarly, the dye known as FD&C Green No. 1 comprises a triphenylmethane dye and is the monosodium salts of 4-[4-N-ethyl-p-sulfobenzylamino) diphenylmethylene]-[1-(N-ethyl-N-p-sulfoniumbenzyl)-2-5-cyclohexadieneimine]. A full recitation of all FD&C and D&C and their corresponding chemical structures may be found in the *Kirk-Othmer Encyclopedia of Chemical Technology*, in Volume 5, pages 857-884, which text is accordingly incorporated herein by reference.

The chewing gums of the invention may be in any form known in the art, such as stick gum, slab gum, chunk gum, shredded gum, hard-coated gum, tableted gum, as well as center-filled gum.

A representative process for preparing a chewing gum composition including the inventive flavor delivery system is as follows. The gum base is melted (about 85° to about 90° C.), cooled to from 75° to 80° C. and placed in a pre-warmed (60° C.) standard mixing kettle equipped with sigma blades. Any additional emulsifier for the gum base is then added and mixed in. Next, a portion of the sorbitol and any glycerin is added and mixed in for an additional 3 to 6 minutes. The mixing kettle is cooled and mannitol, and the remainder of the sorbitol and glycerin are then added and mixing is continued. At the time, the unflavored chewing gum temperature is about 39° to about 50° C. the flavor delivery system is then added and incorporated into the base and mixing is continued Finally, the sweetener material is added and mixed for an additional 1 to 10 minutes. The final gum temperature is about 39° C.–50° C. The chewing gum composition is then discharged from the kettle, rolled, scored and formed into chewing gum pieces.

Accordingly, a further embodiment of the present invention relates to a method of preparing a chewing gum composition having improved sustained flavor intensity and release properties which comprises:

(1) Preparing a flavor delivery system wherein the flavor is a solution mixture, by the process comprising
  (a) melting a resin component selected from rosins, rosin esters, and mixtures;
  (b) adding a flavor component to the melted resin component under agitation, and stirring the resulting mixture with external heat withdrawn;
  (c) the flavor component and resin component present in amounts by weight of the final delivery system of from 20% to 80% for the flavor component and from 80% to 20% for the resin component;
  (d) continuing to stir the mixture of Step (c) until it cools to about room temperature; and
  (e) recovering the final plural coated particles.
(2) Adding the resultant delivery system to a homogeneous mixture of a gum base and remaining chewing gum ingredients; and
(3) Forming the resultant mixture into suitable chewing gum shapes.

More particularly, the flavor delivery system of the present invention may be prepared by a method comprising heating a quantity of the resin component to its melting point and preferably to a temperature of about 90° to about 95° C., after which the temperature of the resulting melt may be dropped to a temperature ranging from about 84° to about 86° C. At this point, further heat is withdrawn and the addition of the flavor component commences under agitation. For example one-tenth of the flavor component may be added while the resin is maintained under an agitation of 2500 rpm and a temperature ranging from about 84° to about 86° C. Thereafter, the rest of the flavor is slowly added under agitation until flavor addition is complete, at which point the temperature of the melt will drop to about 50° to 55° C. During agitation, the container lid of the mixing kettle or vat is kept closed to minimize flavor evaporation. The resulting melt is further agitated until mixing is complete, such agitation being maintained, for example, for a period of 3–4 minutes. At this point, the final composite is completely prepared.

In the instance where the emulsifier is added to the flavor delivery system it is initially included together with the resin and the two are then melted and mixed, with the remainder of the processing unchanged. In the instance where additional artificial sweetener such as aspartame is included in the preparation of the flavor delivery system, it may be added generally concurrently or sequentially with that of the flavor component.

As mentioned earlier, the present flavor delivery system may be readily incorporated into a variety of products including comestible products such as chewing gums including both sugared and sugarless gums, pharmaceutical preparations including tablet coatings, dentifrices and dental compositions and industrial non-edible applications such as aroma packaging and "scratch-and-sniff" applications useful for advertising and novelty flavor and aroma delivery.

The following examples serve to provide further appreciation of the invention but are not meant in any way to restrict the effective scope of the invention. All percentages throughout the specification are by weight percent of the final delivery system unless otherwise indicated.

EXAMPLE 1

In this example, representative formulations of the flavor delivery system of the present system were prepared. The specific components of the flavor delivery system comprised a cinnamon flavor oil and the glycerol ester of partially hydrogenated wood gum rosin (Resin Ester #5). Three flavor formulations were prepared and subsequently incorporated into chewing gum compositions, of which the third formulation contained 10% of the emulsifier glycerol monostearate. The systems were prepared in accordance with the method described hereinabove in the individual proportions as set forth in Table 1A, below.

TABLE 1A

| INVENTIVE FLAVOR DELIVERY SYSTEM FORMULATIONS | | | |
|---|---|---|---|
| INGREDIENTS (WT. %) | A | B | C |
| Resin Component | 77.8 | 50.0 | 45.0 |
| Emulsifier | — | — | 10.0 |
| Flavor Component | 22.2 | 50.0 | 45.0 |

As indicated, each of the above formulations was prepared identically and was thereafter observed for its physical characteristics on completion. Formulation A was received as a semi-solid, Formulation B was a liquid of desired consistency, and Formulation C was an acceptable liquid of lower viscosity than Formulation B. Upon analysis, Formulation B was determined to contain 51.6%±5 of flavor (theoretical—50%).

The above formulations were then incorporated into differing gum compositions for comparative testing and sensory evaluation. Accordingly, the flavor systems A, B and C were prepared with cinnamon flavor and were combined with hydrous gum bases as set forth in Table 1B, below. Control gum with liquid cinnamon flavor was also prepared.

TABLE 1B

| HYDROUS CHEWING GUM COMPOSITIONS | | | | |
|---|---|---|---|---|
| INGREDIENTS (WT. %) | Control | A | B | C |
| Gum Base | 28.0 | 28.0 | 28.0 | 28.0 |
| Water | 0.14 | 0.14 | — | 0.14 |
| Corn Syrup 44 BE' | 12.40 | 12.40 | 9.36 | 12.40 |
| Softener | 0.80 | 0.80 | — | 0.80 |
| Sugar 6X | 56.9722 | 51.4705 | 59.3824 | 55.0536 |
| Color (FD&C Red #40 a.l.) | 0.118 | 0.118 | 0.118 | 0.118 |
| Liquid Flavor | 1.5698 | — | — | — |
| Flavor delivery system | — | 7.0715 (1.5698 flavor) | 3.1396 (1.5698 flavor) | 3.4884 (1.5698 flavor) |

The above compositions were prepared in conventional fashion into stick form and were then subjected to chew testing for sensory evaluation. The results of the sensory evaluation are set forth in FIG. 1.

Figure 1:
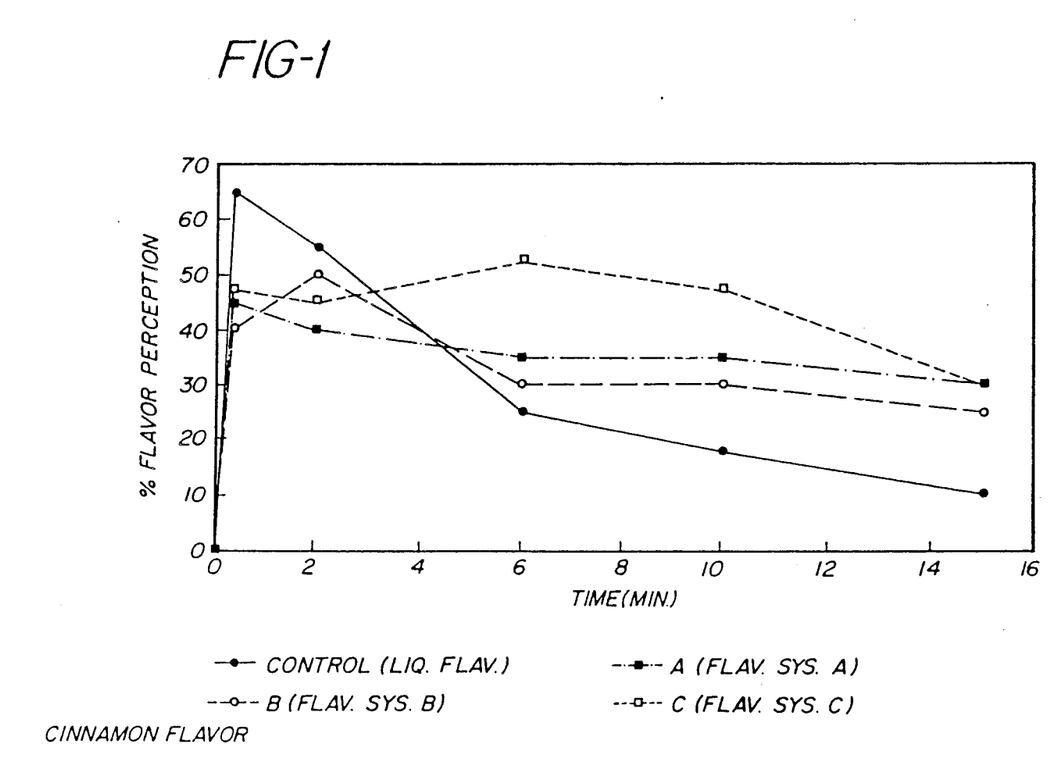
FIG. 1 is a graph presenting the results of comparative sensory evaluation testing of three hydrous sugared cinnamon chewing gums containing the inventive flavor delivery system prepared with cinnamon, and a control gum containing conventional liquid cinnamon flavor.

Referring to FIG. 1, the gum sample labeled A offered a soft chew from the beginning to the end in combination with an improved flavor release extending over 15 minutes. The gum composition including flavor delivery system B had an extended flavor delivery although the gum formulation was not as uniform Lastly, gum composition C including flavor system C exhibited higher flavor release with respect to the control.

All of the above gum compositions delivered more flavor beyond 15 minutes and offered improved flavor uniformity and intensity throughout this period.

EXAMPLE 2

In this example, further representative peppermint flavor delivery systems were prepared for comparison as to their physical properties.

The respective flavor-resin composites were prepared in the same fashion as described herein above and with reference to Example 1, and the formulations set forth below differed only in the proportions of ingredients with respect to each other. The respective flavor-resin composites are set forth below in Table 2.

TABLE 2

| FLAVOR/RESIN BLEND FORMULA | | | | | |
|---|---|---|---|---|---|
| INGREDIENTS (WT. %) | BROAD RANGE | D | E | F | G |
| Glycerol ester of partially hydrogenated wood/gum rosin | 20–80% | 75.0 | 60.0 | 50.0 | 25.0 |
| Liquid flavor | 80–20% | 25.0 | 40.0 | 50.0 | 75.0 |
| Phase | | semi solid | thick liquid | thick liquid | thin liquid |
| Viscosity (cps) | | — | 1000–1500 | 400–600 preferred | 100–200 |

Of the formulations prepared and listed above, the formulation of Sample F was preferred, as it provided a desired combination of physical properties and flavor content. Upon analysis, Sample F was determined to contain 53±5% of flavor (theoretical—50%).

EXAMPLE 3

In this example, three representative gum compositions were compared for comparative sensory evaluation testing. The compositions comprised a standard peppermint sugared gum composition which was prepared in accordance with standard gum formulation procedures for this particular gum product. The control composition contained a conventional liquid peppermint flavor while the inventive Examples H and I contained respectively the flavor delivery system of Sample F prepared in Example 2 with peppermint oil, and a combination of liquid flavor and Sample F. The particular percentages of ingredients are set forth in Table 3, below.

TABLE 3
GUM FORMULA WITH FLAVOR/RESIN BLEND
HYDROUS GUMS

| INGREDIENTS (WT. %) | Control | H | I |
|---|---|---|---|
| Gum Base | 24.810 | 24.810 | 24.810 |
| Corn Syrup | 13.388 | 13.388 | 13.388 |
| Sugar | 60.976 | 60.150 | 59.737 |
| Flavor | | | |
| Liquid Flavor | 0.826 | — | 0.413 |
| Flavor/Resin Blend (Sample F) | — | 1.652 (0.826 flavor) | 1.652 (0.826 flavor) |

Comparative chew panel testing was conducted with the gum compositions listed in Table 3. The test samples of gum were given to an expert chew panel for evaluation and were rated primarily according to flavor intensity and longevity at intervals of 30 seconds, 2, 6, 10 and 15 minutes. The results are set forth in FIG. 2 and in Table 3A, below.

TABLE 3A
PEPPERMINT GUMS WITH FLAVOR/RESIN BLEND
GUM PANEL RESULTS
FLAVOR PERCEPTION CORE
HYDROUS GUMS

| | Control (liquid flavor) | H (flavor-resin blend) | I (liquid flavor + flavor-resin blend) |
|---|---|---|---|
| 30 secs. | 65 | 40 | 75 |
| 2 min. | 35 | 47 | 57 |
| 6 min. | 15 | 32 | 40 |
| 10 min. | 5 | 22 | 32 |
| 20 min. | 0 | 15 | 25 |
| 30 min. | 0 | 15 | 22 |

Figure 2:
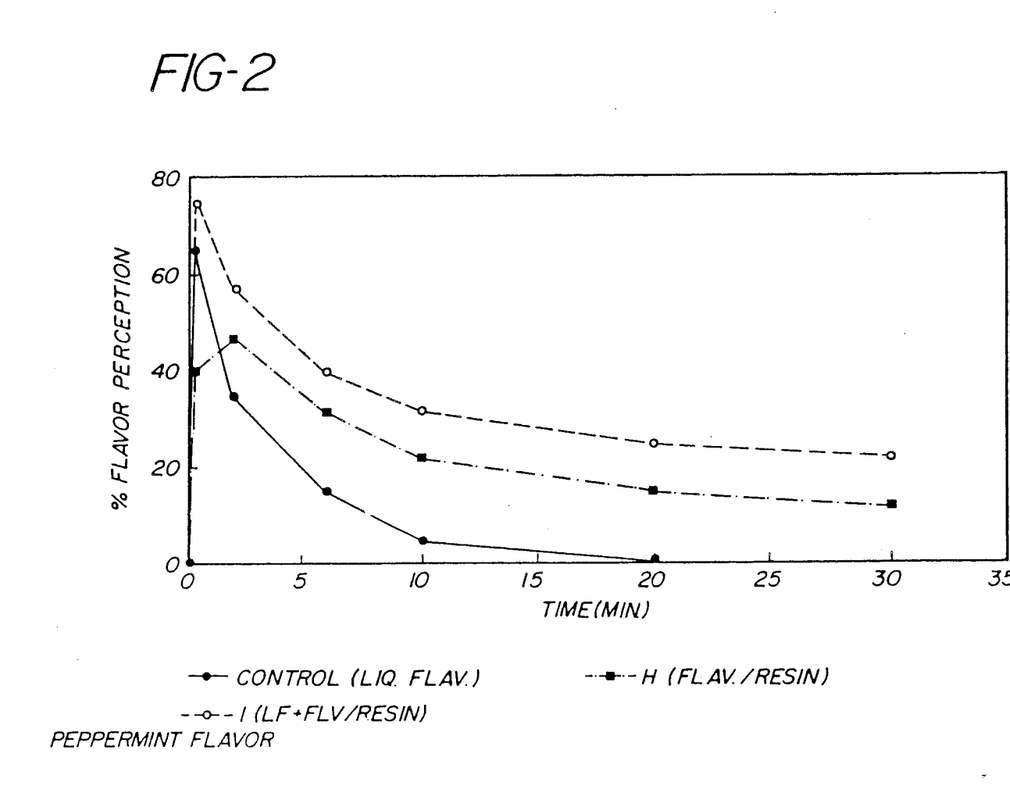
FIG. 2 is a graph comparing the flavor intensity and longevity of hydrous peppermint sugar gum compositions containing the flavor delivery system alone, and in combination with liquid flavor, respectively, with a control gum formulation containing conventional liquid flavor

As can be seen From FIG. 2, inventive gum Samples H and I scored better than the Control sample and offered both higher and longer lasting flavor delivery. Of the samples tested, Sample I was noted to offer the softest chew as well as the highest and longest lasting flavor. In addition, Sample I provided a uniform release of flavor during the chew, as well as improved flavor perception over Sample H.

EXAMPLE 4

Additional gum samples were prepared to compare the attributes of the present flavor delivery system in anhydrous gum formulations. Accordingly, five samples comprising a control and inventive Samples J, K, L and M were formulated in accordance with standard formulation techniques for low moisture gums and possessed the ingredients and amounts as set forth in Table 4, below. The flavor delivery system of the present invention was derived from Sample F prepared in Example 2, and flavor combinations included liquid flavor, spray dried flavor and/or the present flavor delivery system.

TABLE 4
GUM FORMULA WITH FLAVOR/RESIN BLEND
ANHYDROUS GUMS

| INGREDIENTS (WT. %) | Control | J | K | L | M |
|---|---|---|---|---|---|
| Gum Base | 26.0 | 26.0 | 26.0 | 26.0 | 26.0 |
| Softener | 9.8 | 5.2 | 5.2 | 5.2 | 5.2 |
| Carbohydrates | 59.6 | 63.2 | 62.7 | 62.45 | 61.95 |
| Flavor | | | | | |
| Liquid Flavor | 1.5 | — | — | 0.75 | 0.75 |
| Spray Dried Flavor | 0.5 | — | 0.5 | — | 0.50 |
| Flavor/Resin Blend (Sample F) | — | 3.0 (1.5 flavor) | 3.0 (1.5 flavor) | 3.0 (1.5 flavor) | 3.0 (1.5 flavor) |
| Sweetener | | | | | |
| Free and encapsulated saccharin (2000 ppm) | 2.6 | 2.6 | 2.6 | 2.6 | 2.6 |

Comparative chew panel testing was then conducted with two of the samples set forth in Table 4, comprising the control and Sample K. As with Example 3, an expert chew panel was asked to evaluate the samples for the same attributes, and to offer evaluations at the same intervals. The ratings of the samples by the panel members are set forth in FIG. 3, and in Table 5, below.

TABLE 5
PEPPERMINT GUMS WITH FLAVOR/RESIN BLEND
GUM PANEL RESULTS
FLAVOR PERCEPTION SCORE
ANHYDROUS GUMS

| | Control +liquid flavor +liquid flavor) | K (s.d. flavor +flavor-resin blend) | M (s.d. flavor +liquid resin blend) |
|---|---|---|---|
| 30 secs. | 65 | 70 | 88 |
| 2 min. | 45 | 52 | 68 |
| 6 min. | 34 | 50 | 58 |
| 10 min. | 25 | 37 | 57 |
| 15 min. | 14 | 34 | 50 |

Figure 3:
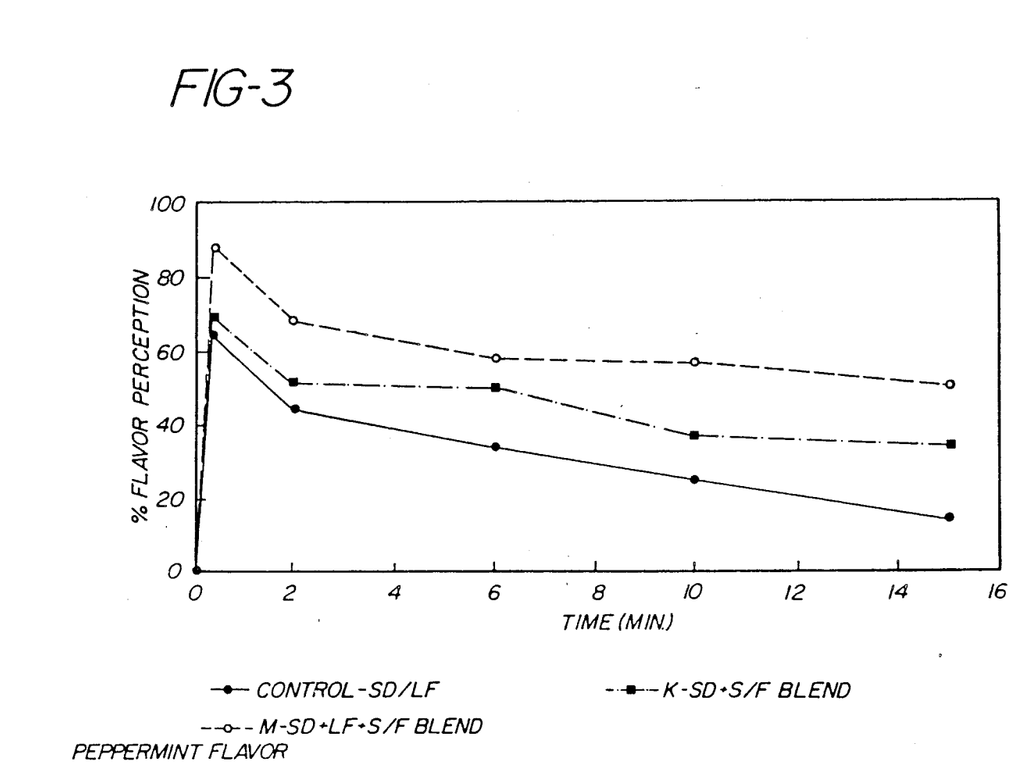
FIG. 3 is a graph depicting the intensity and longevity of an anhydrous peppermint gum composition containing the flavor delivery system of the present invention with spray dried flavor, compared with a control composition utilizing a conventionally prepared combination of a spray dried flavor and a liquid flavor.

As can be seen from FIG. 3, Sample K offered a greater flavor intensity which continued throughout the test period. As can be seen in Table 5, Sample M exhibited substantially greater flavor extension and provided more flavor release even after fifteen minutes. As can also be seen from Table 4, Samples J and L compared to the Control exhibited prolonged flavor release. In addition, the inventive samples displayed a delay in flavor release of up to about five minutes, because the resin desirably retains and protects the flavor for a period of time before it is released.

EXAMPLE 5

In this Example, the flavor delivery system of the present invention was prepared with a quantity of a sweetener. In particular, a flavor-resin composite was prepared which contained in addition 10% of the sweetener acesulfame-K. First, the resin was heated to its melting point and thereafter cooled to between 84°–86° C., at which point the heat was turned off and the flavor including the sweetener was added under agitation. The agitation continued while the temperature continued to drop while the resin was slowly dissolved into solution. When the resulting mixture reached 55° C., it was mixed for 3–5 minutes additional and thereafter transferred to a glass jar and permitted to drop to room temperature. The flavor-resin composite possessed a peppermint flavor and was incorporated into a hydrous gum composition for comparative testing.

The gum samples comprised a control sample containing liquid flavor and the flavor resin composite alone (Sample N), the liquid flavor and the flavor resin composite including 10% acesulfame-K (Sample O) and a comparative Sample P wherein the flavor resin composite and liquid flavor of Sample N were supplemented by the addition of 2.9712% of encapsulated acesulfame-K. The formulations are set forth in Table 6, below

TABLE 6

| INGREDIENTS (WT. %) | N | O | P |
|---|---|---|---|
| Gum Base | 24.81 | 24.81 | 24.81 |
| Corn Syrup | 13.388 | 13.388 | 13.388 |
| Sugar 6X | 59.324 | 59.324 | 56.3528 |
| Delivery System | | | |
| 1. Liquid flavor | 0.826 | 0.826 | 0.826 |
| 2. Flavor-resin | 1.652 (0.826 flavor) | — | 1.652 (0.826 flavor) |
| 3. Flavor-resin + 10% ascesulfame-K | — | 1.652 (0.826, flavor 1652 ppm) | — |
| Encapsulated Acesulfame-K | — | — | 2.9712 (1652 ppm) |

Comparative chew panel testing of Samples N, O and P was conducted primarily to evaluate sweetness intensity and extension, and secondarily, to measure flavor perception. Ratings were made at intervals of 30 seconds, 2 minutes, 6 minutes, 10 minutes and 15 minutes. The scores of individual panel members were averaged and are presented in FIG. 4.

Figure 4:
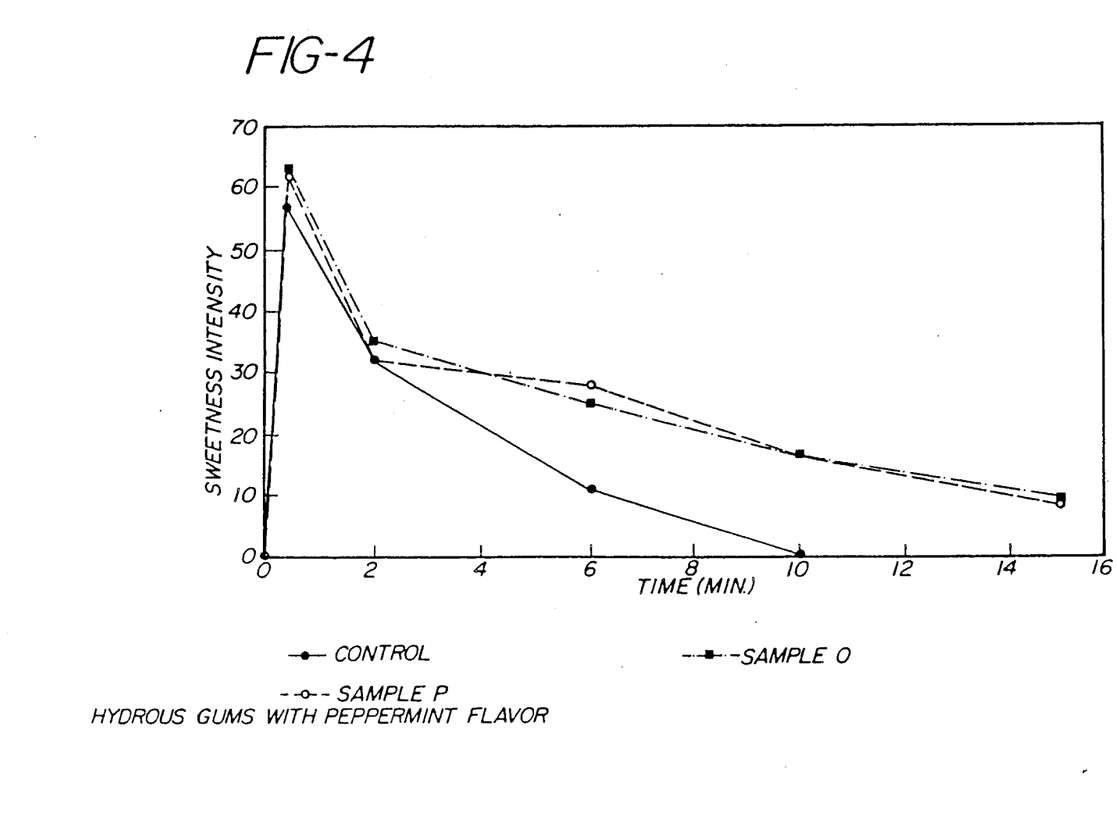
FIG. 4 is a graph comparing the sweetness intensity and extension of a hydrous peppermint-flavored chewing gum composition prepared with a delivery system of the invention including 10% acesulfame-K (Sample O), with like gum compositions respectively containing a flavor delivery system with no sweetener (Sample N), and having encapsulated acesulfame-K.

Referring to FIG. 4, the test results revealed that, while Sample N exhibits essentially no flavor at 10 minutes, Sample O provided acceptable long lasting flavor in conjunction with sweetness that extended over fifteen minutes. The sweetness delivery and extension of Sample O was as good as or is equal to that of Sample P, where acesulfame-K was applied to the gum as a coating. Clearly, the delivery system of the present invention is able to exert its protective effect on sweetener as well as flavor to provide a conjoint improvement in the retention and delivery of both actives.

EXAMPLE 6

In this example, several sugarless spearmint-flavored gum samples were prepared to compare the attributes of the present flavor delivery system formulated with spearmint flavor. The inventive delivery system was prepared in similar manner to Example 1 and contained equal amounts of flavor and resin. Five samples comprising two control samples labeled I and II, respectively, and inventive Samples Q, R and S were formulated in accordance with standard techniques for spearmint flavored sugarless gums and possessed the ingredients and amounts set forth in Table 7, below. Thus, both Controls I and II contained only liquid spearmint flavor with Control II containing the greater amount. Correspondingly, Sample Q contained the inventive flavor-resin blend alone, while Samples R and S contained a combination of the present flavor-resin blend and conventional liquid spearmint flavor.

TABLE 7

SUGARLESS SPEARMINT GUM WITH FLAVOR/RESIN BLEND

| INGREDIENTS (WT. %) | Control I | Control II | Q | R | S |
|---|---|---|---|---|---|
| Gum Base | 23.0 | 23.0 | 23.0 | 23.0 | 23.0 |
| Softener | 15.50 | 15.50 | 15.50 | 15.50 | 15.50 |
| Carbohydrates | 60.128 | 59.728 | 58.928 | 59.328 | 58.928 |
| Color | 0.172 | 0.172 | 0.172 | 0.172 | 0.172 |
| Liquid Flavor | 1.20 | 1.60 | — | 1.20 | 0.80 |
| Flavor/Resin Blend | — | — | 2.40 | 0.80 | 1.60 |

Comparative chew panel testing of Control I, Control II and Samples Q and S was then conducted in accordance with standard procedures to evaluate flavor intensity and longevity of the gums. The chew panel made evaluations at 30 seconds and at 2, 5, 10, 15 and 25 minutes, and the results of their evaluations are presented in FIG. 5.

Figure 5:
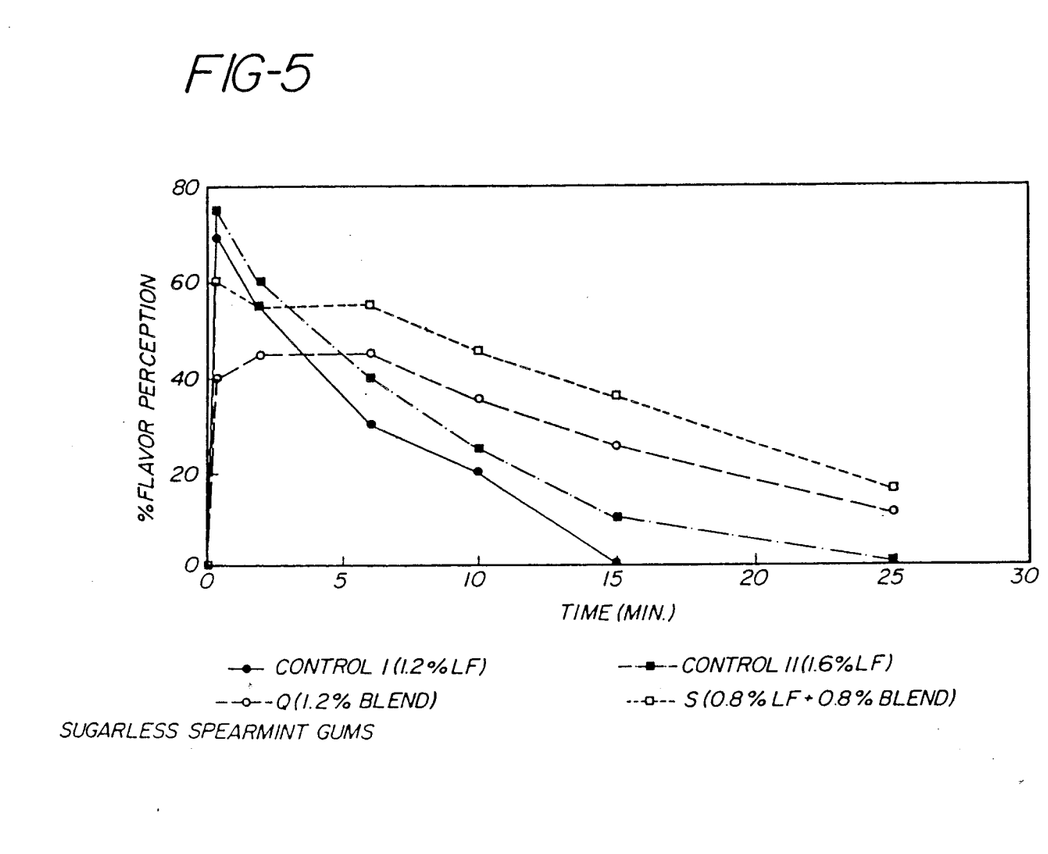
FIG. 5 is a graph comparing the intensity and longevity of two sugarless spearmint gums containing spearmint flavor-resin blends as part of their flavor component, with control gums containing differing amounts of free liquid spearmint flavor above.

Referring to FIG. 5, the results of the evaluations demonstrate the expected improvement in both intensity and longevity of flavor delivery attributable to the present flavor delivery system, that could not be achieved merely by the addition of a greater amount of free liquid flavor as was done in Control II. A desirable combination of initial flavor burst and greater overall intensity and extension was achieved by the combination of free liquid spearmint flavor and the present flavor delivery system as illustrated by Samples Q and S. Both inventive formulations delivered acceptable levels of flavor for more than 15 minutes and continued to deliver flavor for 25 minutes.

This invention may be embodied in other forms or carried out in other ways without departing from the spirit or essential characteristics thereof The present disclosure is therefore to be considered as in all respects illustrative and not restrictive, the scope of the invention being indicated by the appended claims, and all changes which come within the meaning and range of equivalency are intended to be embraced therein.

What is claimed is:

1. A flavor delivery system offering improved uniformity and extended duration of flavor release and temperature stability consisting essentially of a non-aqueous solution mixture of:
   (a) a flavor component in an amount of from about 20% to about 80% by weight of the final delivery system; and
   (b) a resin component, said resin component comprising a rosin, in an amount of from about 80% to about 20% by weight of the final delivery system; wherein said resin component protects, holds and masks the aroma of said flavor component even at high temperatures, whereby said flavor delivery system may be formulated with higher concentrations of said flavor component and exhibits said extended duration of flavor release.

2. The flavor delivery system of claim 1 wherein said flavor component comprises a flavor oil.

3. The flavor delivery system of claim 1 wherein flavoring oil is selected from the group consisting of spearmint oil, cinnamon oil, oil of wintergreen (methylsalicylate), peppermint oil, lemon oil, orange oil, grape oil, lime oil, grapefruit oil, apple essence, strawberry essence, cherry essence, pineapple essence, banana oil and mixtures thereof.

4. The flavor delivery system of claim 1 wherein the flavor component is added in amounts of about 35% to about 65% by weight and the resin is added in amounts of about 65% to about 35% by weight.

5. The flavor delivery system of claim 1 wherein the flavor component and resin component are employed in equal amounts with respect to each other.

6. The flavor delivery system of claim 1 wherein the resin component is selected from the group consisting of rosins, rosin esters, and mixtures.

7. The flavor delivery system of claim 6 wherein the resin component is selected from the group consisting of pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin glycerol ester of wood rosin and partially hydrogenated wood rosin and partially hydrogenated methyl ester of rosin, such as polymers of alpha-pinene or beta-pinene; terpene resins including polyterpene; and mixtures thereof.

8. The flavor delivery system of claim 1 further including an emulsifier.

9. The flavor delivery system of claim 8 wherein said emulsifier is present in an amount of up to about 10% by weight of the final delivery system.

10. The flavor delivery system of claim 9 wherein said flavor component and said resin component are both present in amounts of 45% by weight, and said emulsifier is present in an amount of 10% by weight.

11. The flavor delivery system of claim 1 wherein the emulsifier is selected from the group consisting of monoglycerides, diglycerides and triglycerides of fatty acids, polyglycerol esters, and mixtures thereof.

12. The flavor delivery system of claim 8 wherein the emulsifier is selected from the group consisting of lecithin, stearates, ester derivatives of stearates, palmitates, ester derivatives of palmitates, oleates, ester derivatives of oleates, glycerides, sucrose polyesters, polyglycerolesters and mixtures thereof.

13. The flavor delivery system of claim 1 further including up to 25% by weight of a sweetener.

14. The flavor delivery system of claim 13 wherein the sweetener is a natural or artificial high intensity sweetener selected from the group consisting of amino acid-based sweeteners, dipeptide sweeteners, glycyrrhizin, saccharin and its salts, acesulfame salts, cyclamates, steviosides, talin, sucralose, dihydrochalcone compounds and mixtures thereof.

15. The flavor delivery system of claim 13 wherein the sweetener is acesulfame-K.

16. The flavor delivery system of claim 1 wherein said delivery system is prepared and then processed into solid particulate form.

17. A chewing gum composition offering improved flavor intensity and longevity, comprising a gum base, a sweetener and a flavor delivery system, said flavor delivery system consisting essentially of a nonaqueous solution mixture of:
  (a) a flavor component in an amount of from about 20% to about 80% by weight of the final delivery system; and
  (b) a resin component, said resin component comprising a rosin, in an amount of from about 80% to about 20% by weight of the final delivery system; wherein said resin component protects, holds and masks the aroma of said flavor component even at high temperatures, whereby said flavor delivery system may be formulated with higher concentrations of said flavor component and exhibits said extended duration of flavor release.

18. The chewing gum composition of claim 17, wherein the gum base comprises an elastomer selected from the group consisting of natural rubber, synthetic rubber and mixtures thereof.

19. The chewing gum composition to claim 18, wherein the gum base elastomer is selected from the group consisting of chicle, jelutong, balata, gutta-percha, lechi-capsi, sorva, butadienestyrene copolymers, polyisobutylene, isobutylene-isoprene copolymers, polyethylene, polyvinylacetate, and mixtures thereof.

20. The chewing gum composition of claim 19, wherein the gum base is present in amounts of about 5% to about 85% by weight of the final chewing gum composition.

21. The chewing gum composition of claim 17 further including fillers, coloring agents, flavoring agents, softeners, plasticizers, elastomers, elastomer solvents, sweetening agents and mixtures thereof.

22. A method of preparing a chewing gum composition having improved sustained flavor intensity and release properties and extended duration which comprises:
  (1) Preparing a flavor delivery system wherein the flavor is a solution mixture, by the process comprising:
    (a) melting a resin component selected from rosins, rosin esters, and mixtures;
    (b) adding a flavor component to the melted resin component under agitation, and stirring the resulting mixture with external heat withdrawn;
    (c) the flavor component and resin component present in amounts by weight of the final delivery system of from 20% to 80% for the flavor component and from 80% to 20% for the resin component;
    (d) continuing to stir the mixture of Step (c) until it cools to about room temperature; and
    (e) recovering the final delivery system, wherein said delivery system consists essentially of the flavor component and the resin component as set forth in Step (c);
  (2) Adding the resultant delivery system to a homogeneous mixture of a gum base and remaining chewing gum ingredients; and
  (3) Forming the resultant mixture into suitable chewing gum shapes.

23. The flavor release system of claim 1 incorporated into a confectionery composition.

24. The flavor release system of claim 1 incorporated into a pharmaceutical composition.

25. The flavor release system of claim 1 incorporated into a food product.

26. The flavor release system of claim 1 incorporated into a dentifrice composition or denture adhesive.

27. The flavor release system of claim 1 incorporated into a coating for scratch-and-sniff products and aroma packaging products.

* * * * *